United States Patent [19]
Ii

[11] Patent Number: 6,056,296
[45] Date of Patent: May 2, 2000

[54] METAL GASKET HAVING SEAL STRUCTURE FOR THREE-SURFACE COMBINING PORTION

[75] Inventor: Naoki Ii, Osaka-fu, Japan

[73] Assignee: Nippon Gasket Co., Ltd., Osaka-fu, Japan

[21] Appl. No.: 09/052,950

[22] Filed: Apr. 1, 1998

[30] Foreign Application Priority Data

Apr. 18, 1997 [JP] Japan .................................. 9-115075

[51] Int. Cl.⁷ .................................................. B65D 53/00
[52] U.S. Cl. ........................... 277/595; 277/592; 277/594
[58] Field of Search .................................. 277/592, 591, 277/595, 594

[56] References Cited

U.S. PATENT DOCUMENTS

| | | | |
|---|---|---|---|
| 4,397,472 | 8/1983 | Czernik | 277/592 |
| 5,544,901 | 8/1996 | Kubouchi et al. | 277/591 |
| 5,727,791 | 3/1998 | Weiss et al. | 277/592 |

FOREIGN PATENT DOCUMENTS

| | | |
|---|---|---|
| 0701051 | 3/1996 | European Pat. Off. . |
| 2441772 | 6/1980 | France . |
| 4337758 | 1/1995 | Germany . |
| 19534962 | 3/1997 | Germany . |
| 61-148962 | 9/1986 | Japan . |
| 63-048059 | 4/1988 | Japan . |
| 8-074659 | 3/1996 | Japan . |
| 1033507 | 6/1966 | United Kingdom . |

*Primary Examiner*—Anthony Knight
*Assistant Examiner*—Alison K. Pickard
*Attorney, Agent, or Firm*—Browdy and Neimark

[57] ABSTRACT

This metal gasket is adapted to excellently seal a height different portion occurring on the opposed surfaces of a cylinder block and a chain case, by elastic members provided in recessed portions of full beads on an elastic metal plate. In this metal gasket, a first elastic metal plate is laminated on a second elastic metal plate so that the ridges of full beads on the first elastic metal plate contacts the second elastic metal plate. The first elastic metal plate is provided with a half bead extending along the circumference of an opening in which a camshaft driving chain travels, and full beads position in the regions which correspond to the opposed surfaces of a three-surface combining portion. In order to seal a height different portion occurring on the opposed surfaces of the three-surface combining portion, elastic members are provided in the recessed portions of the full beads formed on the first elastic metal plate, in such a manner that the elastic members are positioned in the three-surface combining portion.

8 Claims, 5 Drawing Sheets

METAL GASKET HAVING SEAL STRUCTURE FOR THREE-SURFACE COMBINING PORTION

BACKGROUND OF THE INVENTION

1. Field of the Invention

This invention relates to a metal gasket having a seal structure for three-surface combining portions, comprising metal plates adapted to seal clearances between opposed surfaces of a three-surface combining portion formed of parts of, for example, a chain case-carrying cylinder block and a cylinder head.

2. Description of the Prior Art

There is a known metal gasket for air-tightly and liquid-tightly retaining clearances between upper surfaces of a cylinder block and a chain case which are fixed to each other in a contacting state, and a lower surface of a cylinder head. This metal gasket is provided with a main seal portion for sealing a clearance around a combustion chamber which requires a high seal surface pressure, and an auxiliary seal portion for sealing a clearance around the chain case which serves the purpose with a comparatively low seal surface pressure. This metal gasket is formed by extending at least one of laminated thin metal plates, which form the main seal portion, so as to prepare the extended section as a base member of an auxiliary seal portion which serves the purpose with a low surface pressure, and bonding a soft sheet, such as a beater sheet, a graphite sheet or a compressed sheet to one or both surfaces of the base member (refer to, for example, Japanese Utility Model Laid-Open No. 48059/1988).

The metal gaskets applied to a chain case-carrying engine include the metal gasket disclosed in Japanese Patent Laid-Open No. 74659/1996. This metal gasket is capable of reliably preventing the entry of an oil into a stepped portion, which occurs on the opposed surfaces of a cylinder block and a chain case, even when an oil deposited on the chain case scatters during the traveling of a chain. This metal gasket comprises a first elastic metal plate provided with beads along the circumferences of openings through which a camshaft driving chain travels, an intermediate plate having holes therein, and a second elastic metal plate laminated on the intermediate plate. The intermediate plate is provided with seal member for sealing a stepped portion occurring on opposed surfaces of the chain case and cylinder block. The second elastic metal plate is provided with cutout portions in the part thereof which corresponds to this seal member. The holes of the intermediate plate extend from opposed surfaces toward the chain case.

Japanese Utility Model Laid-Open No. 148962/1986 discloses a gasket for a three-surface combining portion. This gasket is applied to a three-surface combining portion in which a bead-carrying gasket is held between first and second members with a liquid sealant inserted between the resultant product and a third member, a seal member which is other than the liquid sealant being packed in a bead in an end section of the gasket in the three-surface combining portion.

In OHC type and DOH type engines, a chain case 19 for holding a camshaft driving chain therein is generally formed separately from a cylinder block 18 as shown in FIG. 10, which chain case 19 provided with a passage 23 is set adjacently to a cylinder block 18, in which a cylinder, i.e. a combustion chamber 25 is provided, and combined therewith by bolts.

A metal gasket is provided between a cylinder head and a chain case 19 and a cylinder block 18. Referring to the drawing, a reference numeral 22 denotes bolt holes. Moreover, in order to reduce the weight of an engine, a fixing side surface of the chain case is formed in an opened state, whereby the weight of the chain case is reduced, the chain traveling passage 23 being formed by an inner surface of the passage 23 in the chain case 19 and a side surface of the cylinder block 18.

In this engine, separate parts are fixed together. Therefore, even when an upper surface 24 of the cylinder block 18 and that 21 of the chain case 19 are finished horizontally, it cannot be avoided that a very small height difference 20 occurs at the portions of the two upper surfaces which are at the upper ends of joint surfaces, i.e. opposed surfaces 26 of the cylinder block 18 and chain case 19. It cannot also be avoided that the height difference 20 increases while the engine is used for a long period of time. When the height difference 20 occurs between these two upper surfaces, a lubricating oil flies in accordance with the traveling of the camshaft driving chain in the chain case 19, and is deposited on the height different portion. The resultant lubricating oil enters the height different portion, and leaks out to the exterior of the chain case or flows into a clearance between the cylinder block 18 and cylinder head.

In this metal gasket, a structure formed by extending the portion of a thin metal plate which is laminated on the side of the cylinder block 18 to prepare this portion as a base member, and bonding a soft sheet to one surface thereof cannot retain the air-tightness and liquid-tightness of the height different portion 20. In a structure formed by extending an intermediately positioned thin metal plate to prepare this extended portion as a base member, and bonding soft sheets to both surfaces thereof, the air-tightness of the height different portion 20 can be retained when the height difference is very small. When the height difference 20 becomes large, a larger thickness of the soft sheets is required to secure the sealing performance of the structure, and it becomes necessary to design the lamination of metal plates with the thickness of a main seal portion and that of these soft sheets taken into consideration. In general, a beater sheet, a graphite sheet and a compressed sheet which constitute a soft sheet has a thickness of at least around 0.5 mm originally, so that it is necessary to set the thickness of the main seal portion in accordance with that of the soft sheet. Therefore, in order to secure a high surface pressure on the main seal portion, the number of thin metal plates to be laminated has to be increased.

In the metal gasket disclosed in the above-mentioned Japanese Patent Laid-Open No. 74659/1996, a seal member is provided separately from the intermediate plate, and a part of an elastic metal plate is cut out so as to provide the seal member therein, the seal member being set practically in the cutout portion. Accordingly, it is necessary to make a cutout portion in the elastic metal plate, and set a seal member stably in the cutout portion. Since the seal member is formed independently and set in the hole of the intermediate plate, it is restricted by the number of the metal plates and the thickness of the intermediate plate in the laminated structure. This metal gasket requires the intermediate plate boring work and elastic metal plate cutout work, so that it becomes inadvantageous with respect to the manufacturing cost including the assembling manday.

Regarding an engine using the chain case-carrying metal gasket, the lower surface of the cylinder head is flat and continuous. When a height difference occurs between the upper surface of the cylinder block and that of the chain case, a method of preventing the entry of an oil in the chain case into the height different portion has to be devised without employing a means, which causes the gasket manufacturing cost to increase, for increasing the number of thin metal plates to be laminated.

SUMMARY OF THE INVENTION

An object of the present invention is to solve these problems, and provide a highly reliable metal gasket adapted to seal clearances between opposed surfaces of a three-surface combining portion of three kinds of separate members, especially, a first member (cylinder block), a second member (chain case) and a third member (cylinder head), capable of reliably providing a seal member on a full bead on the portion of an elastic metal plate which corresponds to a region of a height difference, if any, in adjacent surface of the cylinder block and chain case, whereby it becomes possible to prevent the leakage of an oil from the height different portion, improve the sealability of the three-surface combining portion and regulate a surface pressure easily between the cylinder head and cylinder block, and capable of being manufactured at a low cost.

The present invention relates to a metal gasket adapted to seal clearances between opposed surfaces of a three-surface combining portion comprising a first member provided with combustion chambers, a second member disposed adjacently to the first member so as to form a passage therein, and a third member disposed on and adjacently to the first and second members, the gasket comprising a first elastic metal plate disposed so as to be opposed to the first and second members, and a second elastic metal plate disposed so as to be opposed to the third member and laminated on the first elastic metal plate, the first and second elastic metal plates being provided with combustion chamber holes in the portions thereof which are opposed to the combustion chambers in the first member, and openings in the portions thereof which are opposed to the passage in the second member, the first elastic metal plate being provided with a bead extending along the circumference of the opening, and full beads on the region thereof which is opposed to the opposed surfaces of the three-surface combining portion, ridges of the full beads formed on the first elastic metal plate contacting the second elastic metal plate, elastic members being provided in recessed portions of the full beads so that the elastic members are positioned correspondingly to contact portions of the first and second members.

The recessed portion of each full bead on the first elastic metal plate is formed to a cross-sectionally trapezoidal or cross-sectionally arcuate or substantially cross-sectionally triangular shape. The full bead extends so that the center line thereof extends along the contact surfaces of the three-surface combining portion.

The full bead on the first elastic metal plate is formed so that the center line thereof extend along the opposed surfaces of the three-surface combining portion, and the elastic members are provided in the recessed portion of the full bead so that the elastic members extend along the opposed surfaces of the three-surface combining portion.

In another example, the full bead on the first elastic metal plate is formed so that the center line thereof extends perpendicularly to and over all of the opposed surfaces of the three-surface combining portion, and the elastic members are provided in the recessed portion of the full bead so that the elastic members extend perpendicularly to and over all of the opposed surfaces of the three-surface combining portion.

The elastic members provided in the recessed portion of the full bead are formed out of a synthetic resin. In another example, the elastic members are formed out of a vulcanized rubber material. In still another example, the elastic members are formed out of an unvulcanized rubber material, which is heated, when they are put to use, to vulcanize the rubber material. When an unvulcanized rubber material is used, it is fitted in the recessed portion of the full bead so that it enters the recessed portion excellently and becomes flush with the outer surface of the recess-surrounding region.

The elastic members provided in the recessed portion of the full bead are fixed to the first elastic metal plate by applying a rubber material to the same metal plate or bonding the elastic members to the same metal plate.

The bead formed so as to extend along the circumference of the opening comprises a half bead extending continuously along the circumference of the opening.

When the elastic members are tightened by the first, second and third members in this metal gasket, a part of the elastic members is forcibly fitted in a clearance occurring between contact portions of the first and second members.

This metal gasket is adapted to seal the clearances between the opposed surfaces of a three-surface combining portion comprising a cylinder block constituting the first member, a chain case constituting the second member, and a cylinder head constituting the third member.

When this metal gasket is incorporated in an engine, the elastic members are disposed excellently in the three-surface combining portion of the cylinder head, cylinder block and chain case. When the engine is then driven, the rubber material is vulcanized with the hardness thereof turned to a proper level, by the heat occurring in the engine, so that the sealability of the metal gasket can be improved.

Since this metal gasket is formed as described above, the elastic member positioned between the opposed surfaces, which are in the three-surface combining portion, between the chain case and cylinder block fulfils the function of a seal member for sufficiently offsetting a height difference occurring in the three-surface combining portion. Moreover, this elastic member and full bead cooperate with each other, whereby the sealability of the metal gasket can be improved.

The elastic members contact the height different portion occurring in the three-surface combining portion and eat into the height different portion and a clearance, whereby a surface pressure occurring due to the cooperation of the plastic members and full bead is regulated properly, the sealability of the metal gasket thereby becoming able to be improved.

The elastic members can be incorporated into the first elastic metal plate by applying a rubber material thereto or bonding members of a rubber material thereto. This enables the assembling effectiveness and operation efficiency of the elastic members to be improved, and the manufacturing manday and manufacturing cost to be reduced.

The improvement in the sealability of this metal gasket can be attained by properly regulating the thickness, hardness and length of the elastic members and the height, length and width of the full bead.

Therefore, in this metal gasket, the elastic members have little adverse influence upon the combustion chambers. They prevent the high-temperature high-pressure combustion gas occurring in the combustion chamber holes from leaking to the outside from the clearances between the opposed surfaces, and the liquids flowing in the interior of the holes, such as water holes and oil holes from leaking from the same clearances, and can reliably seal the same clearances with a high sealing surface pressure with respect to the metal gasket.

Even when the height difference between the opposed surfaces of the cylinder block and cylinder head becomes large to cause the sealing surface pressure to decrease, an excellent sealing performance of the metal gasket can be secured by regulating the thickness of the elastic members.

Since this metal gasket utilizes the recessed portion of the full bead on the elastic metal plate so as to fix the elastic members to the elastic metal plate, a special cutting work and a special member for fixing elastic members to an elastic metal plate of a conventional metal gasket are not required, i.e., the elastic members can be provided stably. The metal gasket according to the present invention is not restricted by the laminated structure of elastic metal plates and the number of these metal plates, and enables the number of the elastic metal plates and the parts of the elastic members, the manday required for the assembling of the elastic members and a metal gasket body and the machining of the elastic metal plates, and the manufacturing cost to be greatly reduced.

Even when a height difference exists between the opposed surfaces of the chain case and cylinder block, the elastic members of this metal gasket directly contact the height different portions, and, even when the height difference becomes comparatively large, the height difference is offset by the bead and elastic members, whereby the sealing of the height different portions can be sealed reliably. This improves the sealability of the metal gasket, prevents the oil in the chain case from flying and entering the height different portions of the opposed surfaces that would otherwise be caused by the traveling of the chain, and prevents the scattering and leaking of the oil to the outside.

When such a height difference exists, the length of the elastic members decreases, i.e., the elastic members are compression-deformed between the cylinder head and chain case, whereby the sealability of the metal gasket can be secured. Namely, a decrease in the sealability ascribed to a decrease in the surface pressure between the cylinder head and chain case which occurs on the height different portions can be offset. Moreover, this metal gasket has a simple construction, and is capable of being manufactured easily at a reduced cost.

DESCRIPTION OF THE PREFERRED EMBODIMENTS

Figure 1:
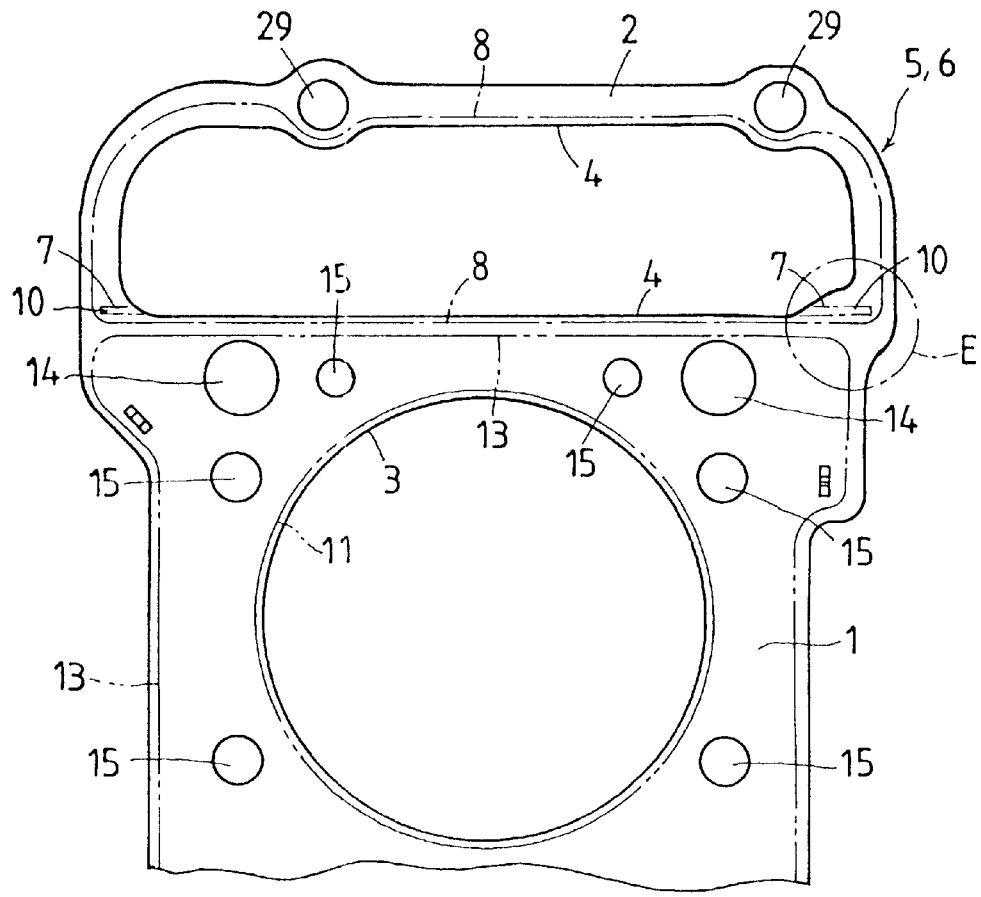
FIG. 1 is a partial plan view showing a first embodiment of the metal gasket having a seal structure for three-surface combining portion according to the present invention.
Figure 2:
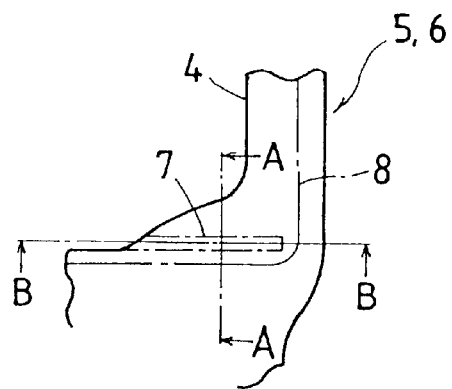
FIG. 2 is an enlarged plan view of a region E of what is shown in FIG. 1.
Figure 3:
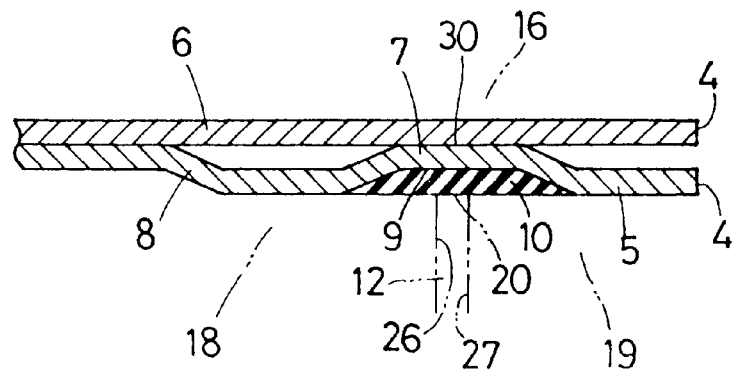
FIG. 3 is a sectional view taken along the line A—A in FIG. 2.
Figure 4:
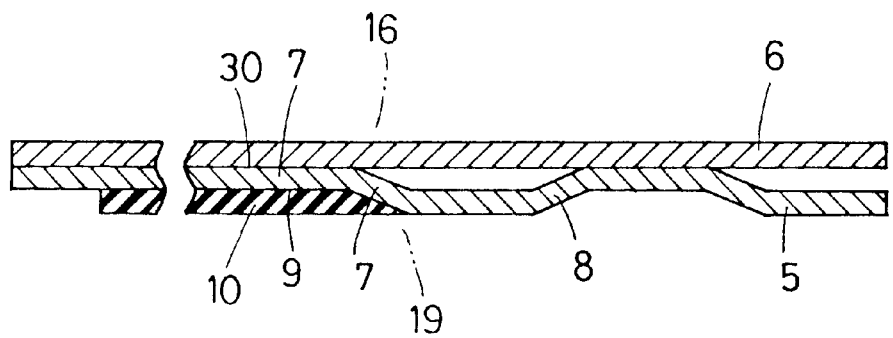
FIG. 4 is a sectional view taken along the line B—B in FIG. 2.

A first embodiment of the metal gasket having a seal structure for three-surface combining portion according to the present invention will now be described with reference to FIGS. 1–8.

The metal gasket of a first embodiment is used by being inserted between a cylinder block 18 to which a chain case 19 in which a camshaft driving chain travels is fixed, and a cylinder head 16, and comprises a main seal 1, and an auxiliary seal 2 integral with the main seal 1 and formed by extending parts of elastic metal plates 5, 6 which constitute the main seal 1. This metal gasket is adapted to seal the clearances between the opposed surfaces of a three-surface combining portion comprising the cylinder block 18 provided with combustion chambers 25 therein, chain case 19 fixed to the cylinder block 18 and provided with a passage 23 in which a chain for driving a camshaft of a valve mechanism travels, and cylinder head 16 fixed to the chain case 19 and cylinder block 18.

The main seal 1 is disposed between an upper surface (opposed surface) 24 of the cylinder block and a lower surface (opposed surface) 28 of the cylinder head 16, and adapted to seal the circumferences of various kinds of holes 15, such as combustion chamber holes 3 formed correspondingly to the cylinders of an engine, i.e. the combustion chambers 25, bolt holes 14, oil holes, knock holes and water holes. The main seal 1 is provided with, for example, bead 11 around the circumferences of the combustion chamber holes 3, and a peripheral bead 13 at the periphery of the main seal 1.

The auxiliary seal 2 is disposed between an upper surface (opposed surface) 21 of the chain case 19 forming a passage 23 and the upper surface 24 of the cylinder block 18 to which the chain case 19 is fixed, and the lower surface 28, which is a continuous flat surface, of the cylinder head 16, the auxiliary seal 2 being provided with a half bead 8 as a peripheral bead at the periphery thereof.

The metal gasket of the first embodiment comprises laminated elastic metal plates 5, 6 constituting the main and auxiliary seals 1, 2 integral with each other, i.e., formed continuously.

This metal gasket is adapted to seal, especially, clearances between the opposed surfaces of a three-surface combining portion formed by three kinds of different members, i.e. the cylinder block 18, a first member, the chain case 19, a second member, and the cylinder head 16, a third member, and comprises a plurality of metal plates, i.e. two elastic metal plates 5, 6 in the embodiment.

This metal gasket can also be formed by not less than three laminated metal plates including elastic metal plates 5, 6 and an intermediate plate. In this metal gasket, the opposed surfaces of the three-surface combining portion comprise the lower surface 28 of the cylinder head 16 and the upper surface 21 of the chain case 19, the lower surface 28 of the cylinder head 16 and the upper surface 24 of the cylinder block 18, and the opposed surface 26 of the cylinder block 18 and the opposed surface 27 of the chain case.

The chain case 19 is formed as a part separate from the cylinder block 18, and fixed to a side surface thereof. The chain case 19 is opened at its fixing side surface with respect to the cylinder block 18 so as to reduce the weight thereof. The chain case 19 has a C-shaped horizontal cross section, and combining surfaces, i.e. opposed surfaces 26, 27 at two parts thereof with respect to the cylinder block 18. The inner surface of the chain case 19 and the side surface of the cylinder block 18 define the passage 23 in which a camshaft driving chain travels.

The elastic metal plates 5, 6 in this metal gasket are provided with combustion chamber holes 3 in the portions thereof which are opposed to combustion chambers 25 in the cylinder block 18, and openings 4 adjacent to the combustion chamber holes 3 and in the portions thereof which are opposed to the passage 23 in the chain case 19. This metal gasket comprises the elastic metal plate 5 (first elastic metal plate), and the elastic metal plate 6 (second elastic metal plate) laminated on the elastic metal plate 5. The elastic metal plate 5 is disposed on the side of the opposed surfaces 26, 27 of the chain case 19 and cylinder block 18. The elastic metal plate 6 is disposed on the side of the cylinder head 16.

Especially, the elastic metal plate 5 of this metal gasket is provided with a bead extending along the circumference of the opening 4, and full beads 7 extending along regions opposed to the opposed surfaces of the parts of the three-surface combining portion which are at both ends of the opening 4 corresponding to the passage 23, and elastic members 10 are provided in recessed portions 9 of the full beads 7 so that the elastic members are positioned on the side of the opposed surfaces of the three-surface combining portion. The elastic metal plate 5 is laminated on the elastic metal plate 6 with ridges 30 of the full beads 7 on the former contacting a flat surface of the latter. The elastic members 10 seal, especially, a region of a height difference 20 which possibly occurs on the opposed surfaces 26, 27 of the cylinder block 18 and chain case 19.

The recessed portion 9 of each of the full beads 7 formed on the elastic metal plate 5 has a cross-sectionally trapezoidal, cross-sectionally arcuate or cross-sectionally triangular shape. The center lines of the full beads 7 extend along the fixing surfaces of the three-surface combining portion. In this metal gasket, the bead formed along the circumference of the opening 4 through which the chain traveling in the passage 23 passes comprises a half bead extending continuously along the circumference of the opening 4.

The elastic members 10 are formed out of a nonmetallic material comprising a rubber material, such as a heat resisting synthetic resin, butadiene acrylonitrile rubber (NBR), silicone rubber and fluororubber. When the elastic members 10 are formed out of a rubber material, a vulcanized rubber material or an unvulcanized rubber material. The elastic members 10 are fixed to the elastic metal plate 5 by applying a rubber material thereto or by bonding finished elastic members thereto. The elastic members 10 are provided excellently so as to fill the clearance 12 in the three-surface combining portion therewith as shown in FIG. 5, by tightening the cylinder head 16, cylinder block 18 and chain case 19 together.

In the case of elastic members 10 formed out of an unvulcanized rubber material, they are heated and vulcanized when they are put to use. As shown in FIG. 5, when this metal gasket is incorporated in an engine and tightened, the unvulcanized rubber material is fitted in the recessed portions 9 of the full beads 7 excellently so that the outer surface is flush with that of the surrounding region, and the elastic members 10 are provided excellently in the three-surface combining portion of the cylinder head 16, cylinder block 18 and chain case 19. When the engine is then driven, the unvulcanized rubber material is vulcanized by the heat occurring in the engine, so that the hardness thereof comes to be at a proper level, this enabling the sealability of the metal gasket to be improved.

Figure 5:
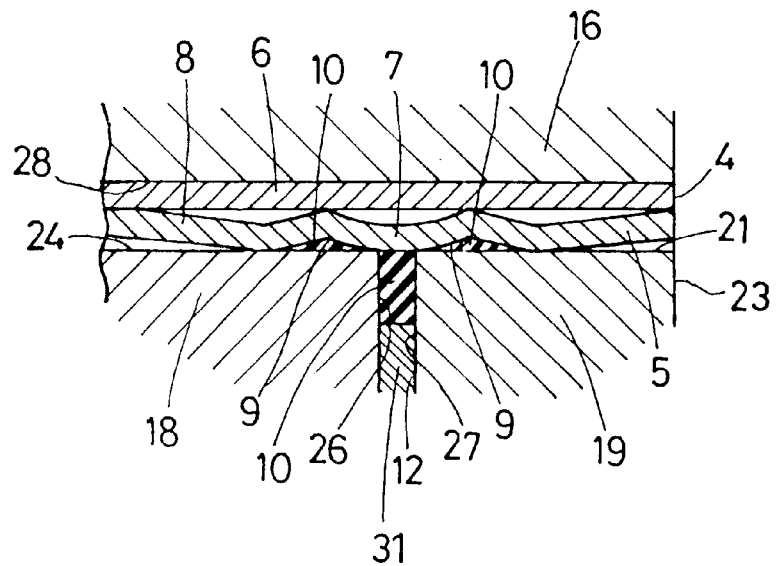
FIG. 5 is a sectional view taken along the line A—A in FIG. 2 and showing this metal gasket incorporated in an engine and tightened.
Figure 6:
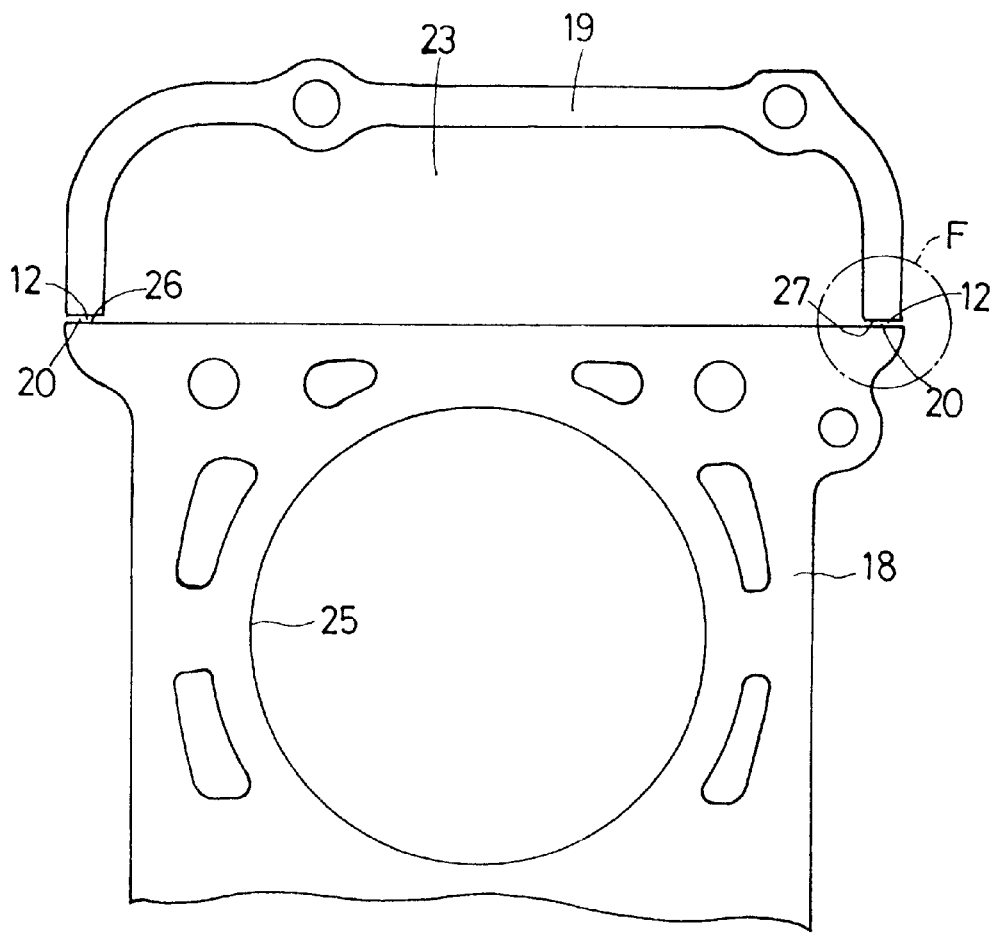
FIG. 6 is a plan view showing a cylinder block and a chain case on which the metal gasket of FIG. 1 is fixed.
Figure 7:
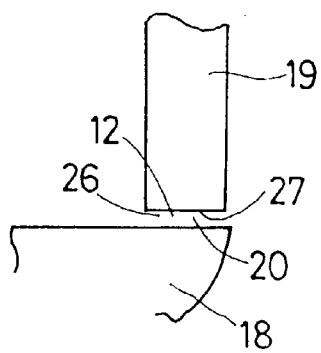
FIG. 7 is an enlarged plan view of a region F of what is shown in FIG. 6.

The condition of the elastic members 10 in the metal gasket incorporated in an engine and tightened is shown in an exaggerated manner in FIG. 5, in which the elastic members 10 are compression deformed so that they comprise a first elastic portion disposed between the elastic metal plate 5 and the upper surface 21 of the chain case 19, a second elastic portion disposed between the elastic metal plate 5 and the upper surface 24 of the cylinder block 18, and a third elastic portion disposed in a clearance 12 between the adjacent surfaces 26, 27 of the cylinder block 18 and chain case 19. The width of the clearance 12 between the adjacent surfaces 26, 27 of the cylinder block 18 and chain case 19 is, for example, around 0.3–0.5 mm, and a gasket 31 of around 0.3–0.5 mm is disposed in this clearance 12, whereby the sealability of the gasket is secured.

Since this metal gasket utilizes the recessed portions 9 of the full beads 7 formed on the elastic metal plate 5, so as to fix the elastic members 10 to the same plate 5 as mentioned above, the special elastic metal cutting work and the preparation of elastic member fixing members, which are employed in a prior art metal gasket, are not required, so that the elastic members can be provided stably. Moreover, the metal gasket according to the present invention is not restricted by the laminated structure and number of the elastic metal plates 5, 6, and it is capable of reducing the number of the elastic metal plates 5, 6 and elastic members 10, the manday for assembling the elastic members 10 and a metal gasket body together, and the manday for machining the elastic metal plates 5, 6, the manufacturing cost being also reduced greatly.

In order that the elastic metal plates 5, 6 can follow up the cylinder head 16 which is easily deformed as compared with the cylinder block 18 and chain case 19, the elastic metal plate 6 positioned on the side of the cylinder head 16 preferably comprises a highly processable material so as to minimize the number of leakage paths between the laminated thin metal plates. The elastic metal plates 5, 6 are formed out of a metal material of a hardness of around Hv300–500, for example, stainless steel. The elastic metal plates 5, 6 are made by heat treating thin metal plates, and a nonmetallic material, for example, fluororubber and acrylic silicone is applied to both the upper and lower surfaces of the resultant metal plates. This enables the metal to metal contacting of the thin metal plates 5, 6, and the cylinder head 16 and the cylinder block 18 and chain case to be avoided, and the corrosion resistance, durability and strength of the metal gasket to be secured. Even when the metal gasket has minute recesses and projections in and on the mechanically processed surfaces thereof, the above-mentioned non-metallic material covers such surfaces, so that the metal gasket can satisfactorily fulfill its sealing function.

Figure 8:
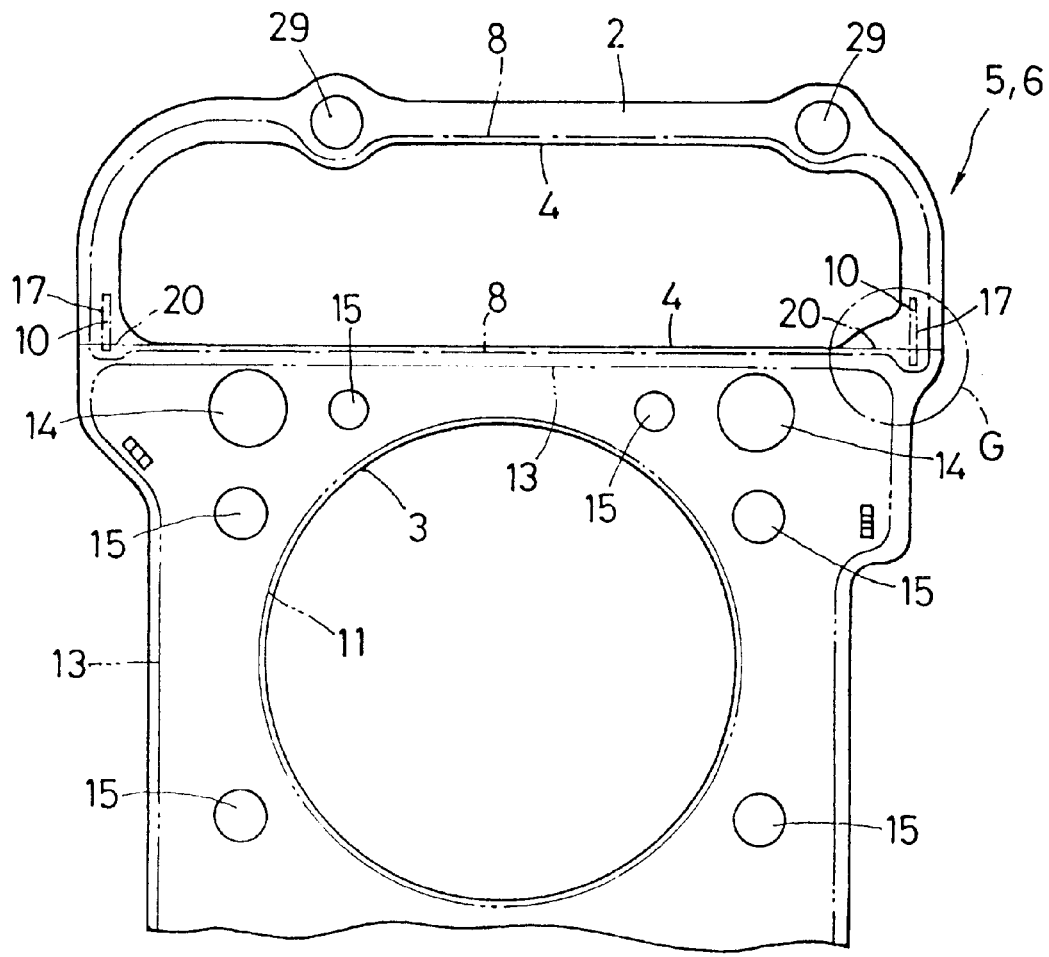
FIG. 8 is a partial plan view showing a second embodiment of the metal gasket having a seal structure for three-surface combining portion according to the present invention.
Figure 9:
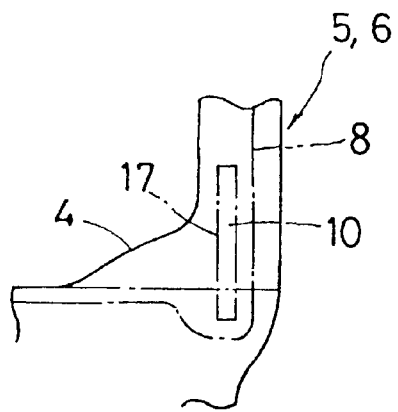
FIG. 9 is an enlarged plan view of a region G of what is shown in FIG. 8.
Figure 10:
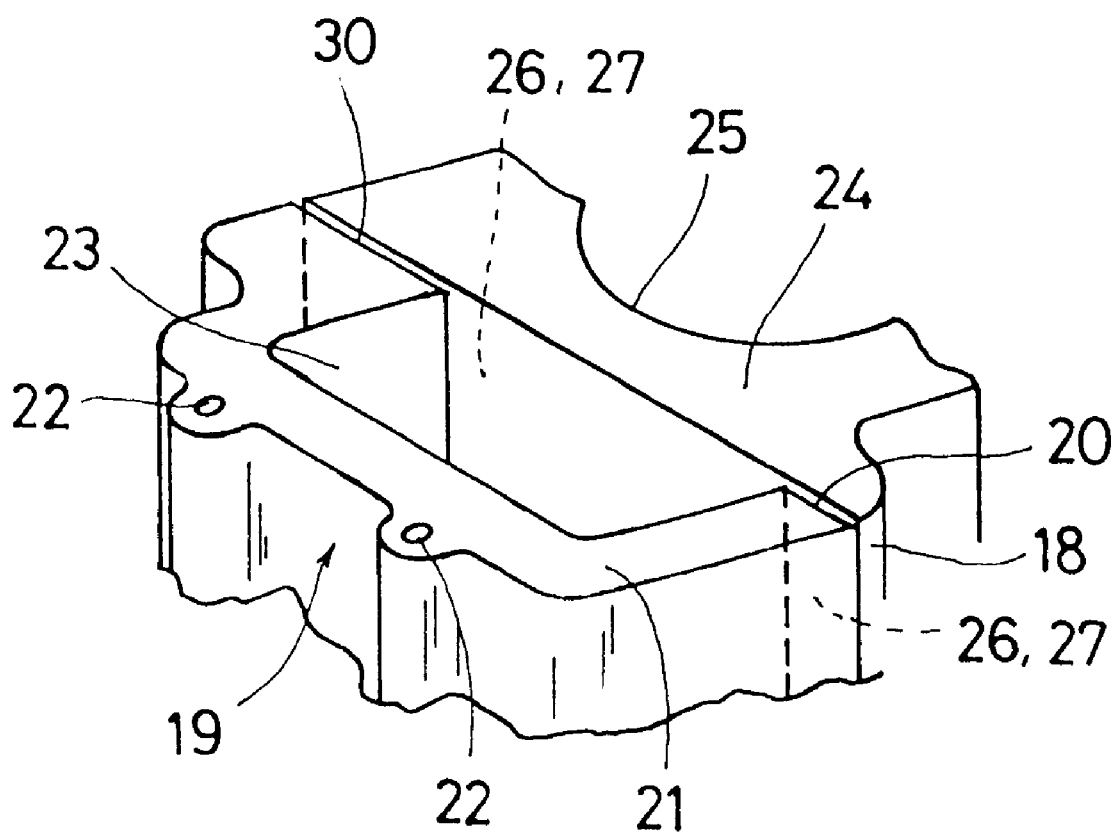
FIG. 10 is a perspective view showing an example of a chain case-carrying cylinder block.

A second embodiment of the metal gasket having a seal structure for three-surface combining portions according to the present invention will now be described with reference to FIGS. 8 and 9.

The second embodiment has completely the same construction as the first embodiment except that the direction in which the full beads are extended and the position of disposition of the elastic members 10 to be provided in the recessed portions of the full beads are different, and, therefore, the same parts are designated by the same reference numerals to omit the duplication of descriptions thereof.

In the second embodiment, the full beads 17 are formed on an elastic metal plate 5 so that the center lines of the full beads extend perpendicularly to and over the opposed surfaces 26, 27 of a three-surface combining portion. The elastic members 10 are provided in the recessed portions of the full beads 17 so as to extend perpendicularly to and over the opposed surfaces 26, 27 of the three-surface combining portion. In the second embodiment, the sealing width of the elastic members is small as compared with that of the elastic members 10 provided in the full beads 7 in the first embodiment, i.e., the end portions of the elastic members 10 extend slightly over the cylinder block 18. However, the working precision of the full beads 17 to be provided in the three-surface combining portion need not be so high as compared with that of the full beads 7. This sealing width is large enough to seal the height difference which would occur between the opposed surfaces 26, 27 of the cylinder block 18 and chain case 19.

What is claimed is:

1. A metal gasket adapted to seal clearances between opposed surfaces of a three-surface combining portion comprising a cylinder block provided with combustion chambers, a chain case disposed adjacently to said cylinder block so as to form a passage therein, and a cylinder head disposed on and adjacently to said cylinder block and said chain case, said gasket comprising:

a first elastic metal plate adapted to be disposed so as to face said cylinder block and said chain case, and a second elastic metal plate adapted to be disposed so as to face said cylinder head and laminated on said first elastic metal plate, said first and second elastic metal plates being provided with combustion chamber holes in portions thereof which are opposed to said combustion chambers in said cylinder block, and an opening in portions thereof which are opposed to said passage in said chain case, said first elastic metal plate being provided with a bead extending along a circumference of said opening, and a full bead on a region thereof which is opposed to said opposed surfaces of said three-surface combining portion, a ridge of said full bead formed on said first elastic metal plate contacting said second elastic metal plate, an elastic member being provided in a recessed portion of said full bead so that said elastic member is positioned correspondingly to contact portions of said cylinder block and said chain case, wherein said full bead on said first elastic metal plate is formed so that a center line thereof extends along said opposed surfaces of said three-surface combining portion, said elastic member being provided in said recessed portion of said full bead so that said elastic member extends along said opposed surfaces of said three-surface combining portion, and wherein when said elastic member is tightened by said cylinder block, said chain case and said cylinder head member, said elastic member is compression deformed so that it comprises a first elastic portion disposed between said elastic metal plate and said cylinder block, a second elastic portion disposed between said elastic metal plate and said chain case, and a third elastic portion forcibly fitted in a clearance occurring between contact portions of said cylinder block and said chain case.

2. The metal gasket according to claim 1, wherein said recessed portion of said full bead is formed so as to include any one of a cross-sectionally trapezoidal shape, a cross-sectionally arcuate shape, and a cross-sectionally substantially triangular shape.

3. The metal gasket according to claim 1, wherein said full bead on said first elastic metal plate is formed so that the center line thereof extends perpendicularly to and over all of said opposed surfaces of said three-surface combining portion, said elastic member being provided in said recessed portion of said full bead so that said elastic member extends perpendicularly to and over all of said opposed surfaces of said three-surface combining portion.

4. The metal gasket according to claim 1, wherein said elastic member provided in said recessed portion of said full bead comprises a synthetic resin.

5. The metal gasket according to claim 1, wherein said elastic member provided in said recessed portion of said full bead comprises a vulcanized rubber material.

6. The metal gasket according to claim 1, wherein said elastic member provided in said recessed portion of said full bead comprises an unvulcanized rubber material, whereby when the gasket is put to use the unvulcanized rubber material is vulcanized.

7. The metal gasket according to claim 1, wherein said elastic member provided in said recessed portion of said full bead is fixed to said first elastic metal plate by applying a rubber material to said metal plate or bonding said elastic member to said metal plate.

8. The metal gasket according to claim 1, wherein said bead formed so as to extend along the circumference of said opening comprises a half bead extending continuously along the circumference of said opening.

\* \* \* \* \*